(12) United States Patent
Takano et al.

(10) Patent No.: US 8,745,815 B2
(45) Date of Patent: Jun. 10, 2014

(54) BLOWER

(75) Inventors: Masayuki Takano, Hamura (JP);
Takeshi Maeno, Hamura (JP)

(73) Assignee: Yamabiko Corporation, Ohme-Shi (JP)

( * ) Notice: Subject to any disclaimer, the term of this patent is extended or adjusted under 35 U.S.C. 154(b) by 168 days.

(21) Appl. No.: 13/372,665

(22) Filed: Feb. 14, 2012

(65) Prior Publication Data

US 2012/0216367 A1    Aug. 30, 2012

(30) Foreign Application Priority Data

Feb. 24, 2011    (JP) .................................. 2011-038458

(51) Int. Cl.
*A47L 5/24*        (2006.01)
*F04D 25/08*    (2006.01)

(52) U.S. Cl.
USPC .................................. 15/344; 15/405; 15/410

(58) Field of Classification Search
USPC ........................ 15/327.5, 344, 345, 405, 410
IPC .......................... A47L 5/24; F04D 25/08,29/66
See application file for complete search history.

(56) References Cited

U.S. PATENT DOCUMENTS 4,674,146 A * 6/1987 Tuggle et al. .................... 15/330
7,300,243 B2 * 11/2007 Saitou et al. .................. 415/119

FOREIGN PATENT DOCUMENTS

JP    2005-163748    6/2005
JP    2010-133184    6/2010

* cited by examiner

*Primary Examiner* — David Redding
(74) *Attorney, Agent, or Firm* — Baker & Hostetler LLP

(57) ABSTRACT

A handheld blower has a body including a combustion engine and a blower section driven by the combustion engine, and a handle coupled to the body. The blower section has an air outlet directed forward with respect to an operator. The handle has a grip portion extending in a front-back direction with respect to the operator, a front arm extending from a front portion of the grip portion to the body, and a rear arm extending from a rear portion of the grip portion to the body. The front arm and the rear arm are more flexible in the front-back direction than in directions perpendicular to the front-back direction.

7 Claims, 4 Drawing Sheets

BLOWER

CROSS-REFERENCE TO RELATED APPLICATIONS

This application claims priority to foreign Patent Application JP 2011-038458, filed on Feb. 24, 2011, the disclosure of which is incorporated herein by reference in its entirety

TECHNICAL FIELD

The present invention relates to a blower, more specifically, to a handheld blower.

BACKGROUND

Conventionally, a handheld blower is used, for example, for blowing away fallen leaves for the purpose of cleaning. Such a blower has a body including an internal combustion engine and a blower section driven by the engine, and a handle coupled to the body. An air outlet of the blower section is directed forward with respect to an operator to blow away fallen leaves and so on in front of the operator. Preferably, a nozzle is attached to the air outlet. The operator grasps the handle and operates by directing the air outlet of the blower to a direction in which the operator wishes to clean. The blower may be used as a vacuum by attaching a suction pipe to an air inlet of the blower section and connecting a bag to the air outlet of the blower section.

The handle generally includes a front handle disposed at an upper portion of the body so that the body can be hung, and a rear handle laterally protruding from the body. In order to reduce a vibration transmitted from the body of the blower to the hands of the operator, it is known that a spring device or anti-vibration rubber device is disposed between the body and the handle.

However, the spring and anti-vibration rubber devices increase the weight of the handheld blower so that the maneuverability of the blower is worsened. Further, providing the spring or anti-vibration rubber device between the handle and the body means that the rigidity between the handle and the body is reduced so that a direction in which the blower blows is not stable; namely, the maneuverability of the blower is worsened.

SUMMARY OF INVENTION

Embodiments of the present invention advantageously provide a handheld blower in which a proper maneuverability thereof can be maintained while a vibration transmitted from the body to the operator can be reduced.

In one embodiment, a handheld blower comprises a body including a combustion engine and a blower section driven by the combustion engine, and a handle coupled to the body, wherein the blower section has an air outlet directed forward with respect to an operator, wherein the handle has a grip portion extending in a front-back direction of the operator, a front arm extending from a front portion of the grip portion to the body, and a rear arm extending from a rear portion of the grip portion to the body, and wherein the front arm and the rear arm are more flexible in the front-back direction than in directions perpendicular to the front-back direction.

As a result of analyzing vibrations of the handheld blower, the present inventors have found that a vibration in the front-back direction with respect to the operator is larger than those in directions (vertical (up-down) and lateral (left to right) directions) perpendicular to the front-back direction. From this viewpoint, the inventive handheld blower advantageously balances a proper maneuverability with a comfortable operation for an operator by reducing vibration mainly in the front-back direction rather than in all directions with respect to the operator of the handheld blower.

By flexing the front arm and the rear arm of the handle in the front-back direction, vibrations in the front-back direction transmitted from the body to the operator can be effectively reduced. On the other hand, since a weight of the handle is much smaller than that of another handle with a spring device or anti-vibration rubber device, and, in the directions perpendicular to the front-back direction, the flexibility between the body and the handle is small or the proper rigidity is maintained, unlike in a blower with a spring device or anti-vibration rubber device, a proper maneuverability of the blower can be maintained.

Further, in an embodiment of the blower according to the present invention, the front arm is pivotally coupled to the grip portion and integrally coupled to the body, and the rear arm is pivotally coupled to the grip portion and integrally coupled to the body.

In this blower, a vibration in the front-back direction transmitted from the body to the operator can be much reduced.

In an embodiment of the blower according to the present invention, a front tube spaced from and disposed around the front arm is coupled to the grip portion and a rear tube spaced from and disposed around the rear arm is coupled to the grip portion.

Further, in an embodiment of the blower according to the present invention, cross sections of the front arm and the rear arm are rectangular, and lengths of the cross sections in the front-back direction are shorter than lengths of the cross sections in a direction perpendicular to the front-back direction.

Further, in an embodiment of the blower according to the present invention, the front arm and the rear arm straightly extend from the grip portion to the body.

In an embodiment of the blower according to the present invention, a density of the grip portion is larger than those of the front and rear arms.

Further, in an embodiment of the blower according to the present invention, the handle is a rear handle laterally extending from the body, and the blower further comprises a front handle coupled to an upper portion of the body.

The handheld blower advantageously maintains a proper maneuverability of the blower while a vibration transmitted from the body to the operator can be reduced.

BRIEF DESCRIPTION OF DRAWINGS

FIG. 1 is a perspective view of a blower according to the present invention;

FIG. 2 is a perspective view of a blower according to the present invention in which a handle is disassembled;

FIG. 3 is an exploded plan view of the handle;

FIG. 4 is a cross-sectional view of the assembled handle along the line IV-IV shown in FIG. 3; and FIG. 5 is a perspective view of a handle of a second embodiment.

DETAILED DESCRIPTION

Now, referring to Figures, embodiments of a blower according to the present invention will be explained.

Figure 1:
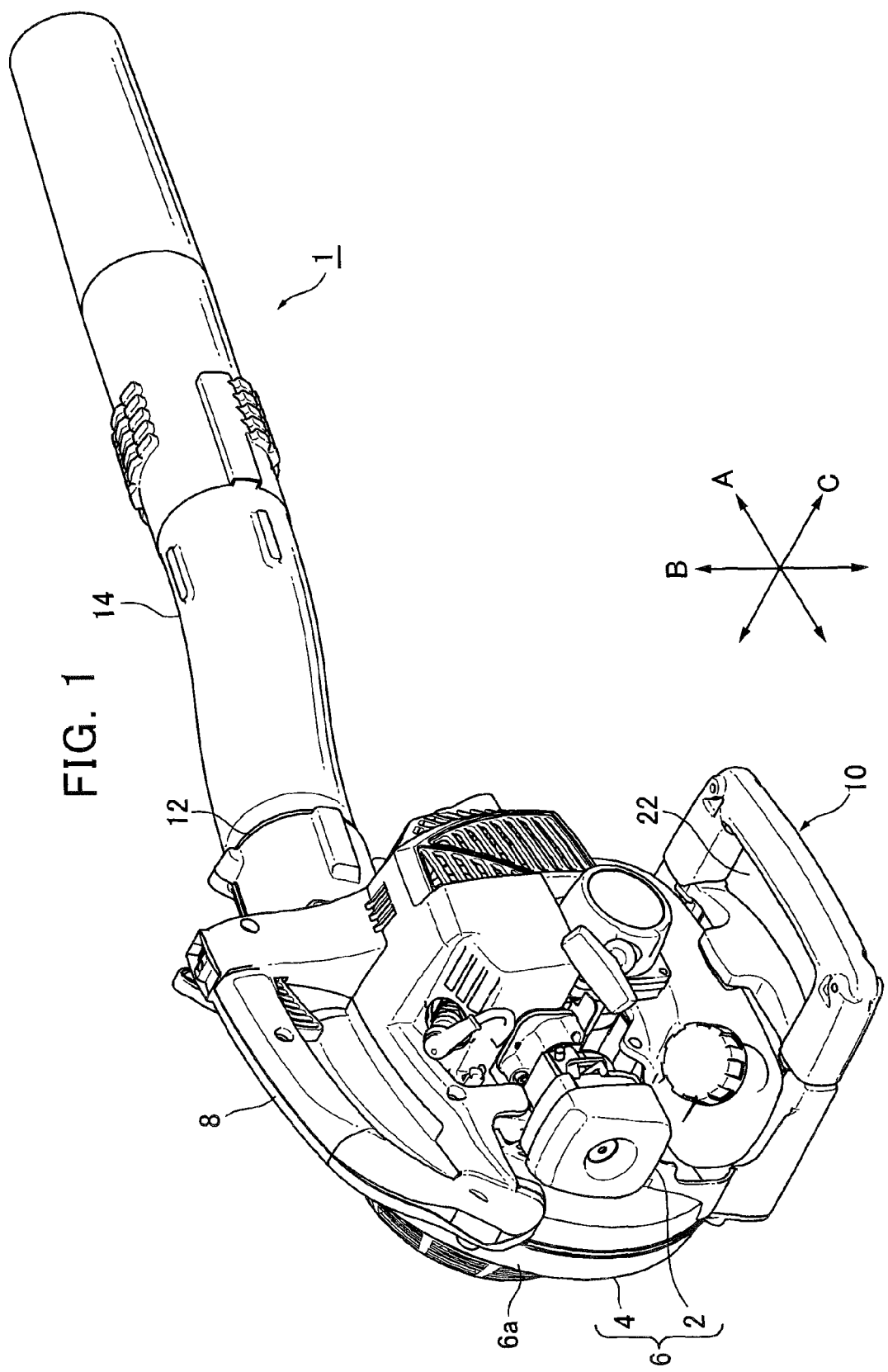
FIGS. 1 to 5 are provided, as follows.
Figure 2:
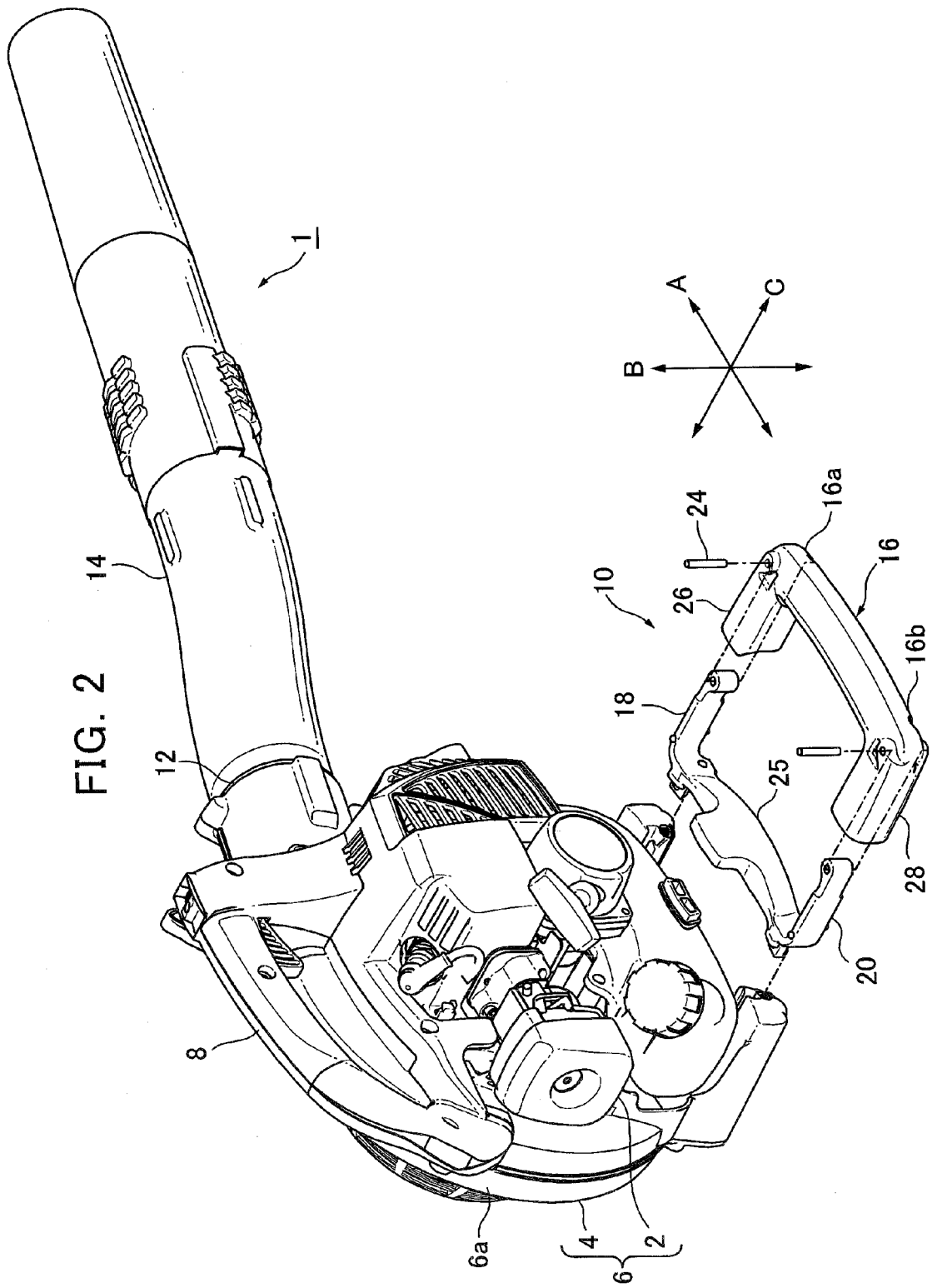

As shown in FIGS. 1 and 2, a handheld blower 1 has a body 6 including a combustion engine 2 and a blower section 4 driven by the combustion engine 2, and two handles 8, 10 coupled to the body 6. In the embodiment shown in FIGS. 1 and 2, the combustion engine 2 is a gasoline engine, and an output shaft (not shown) of the combustion engine 2 is coaxially disposed with a rotational shaft (not shown) of the blower section 4. The blower section 4 has an air outlet 12 directed forward with respect to an operator and an air inlet (not shown) directed laterally. A nozzle 14 is attached to the air outlet 12. A tip of the nozzle 14 is directed slightly downward with respective to the front-back direction A.

The handles 8, 10 include a front handle 8 disposed at an upper portion 6a of the body 6 so that the body 6 can be hung, and a rear handle 10 laterally protruding from a location under the body 6.

Figure 3:
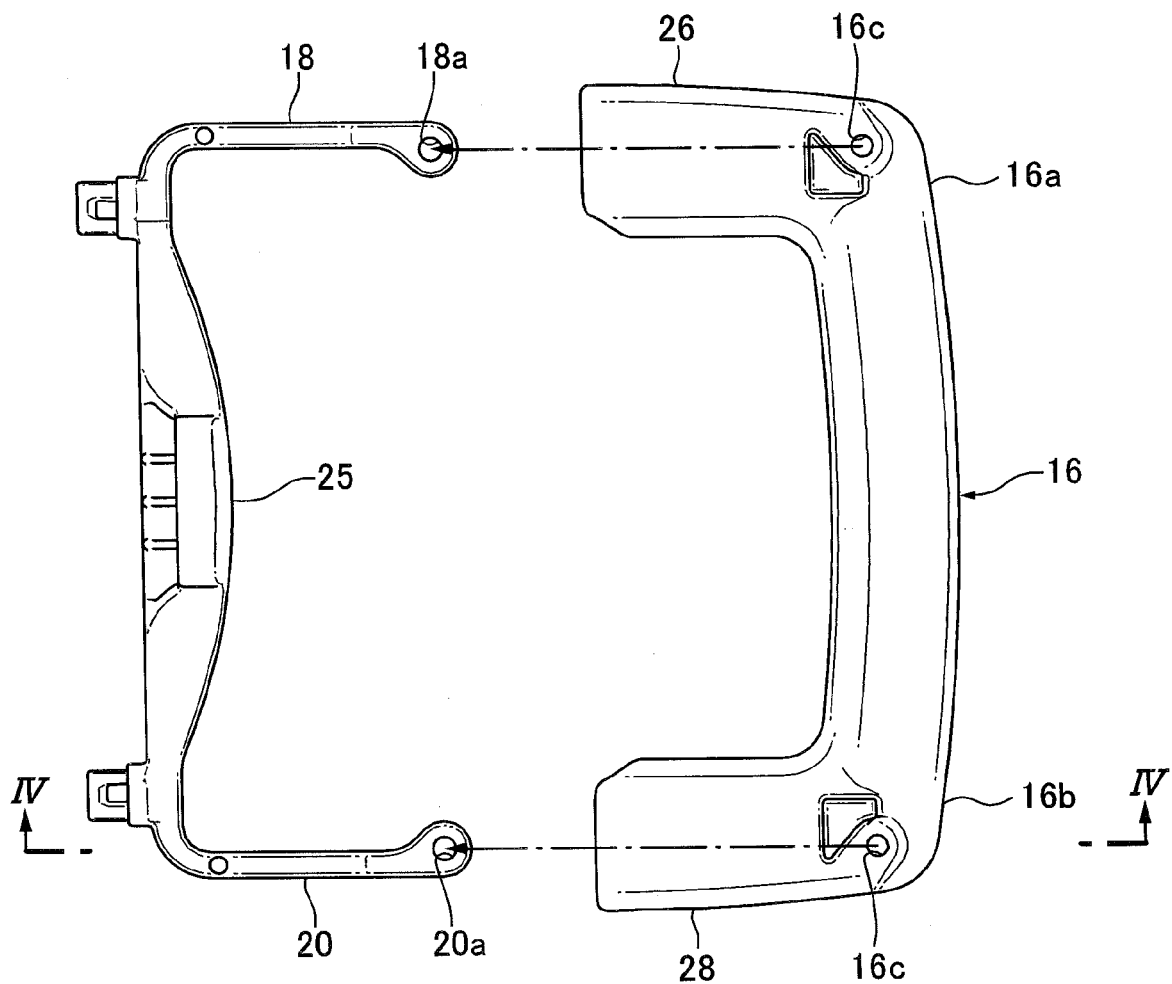
Figure 4:
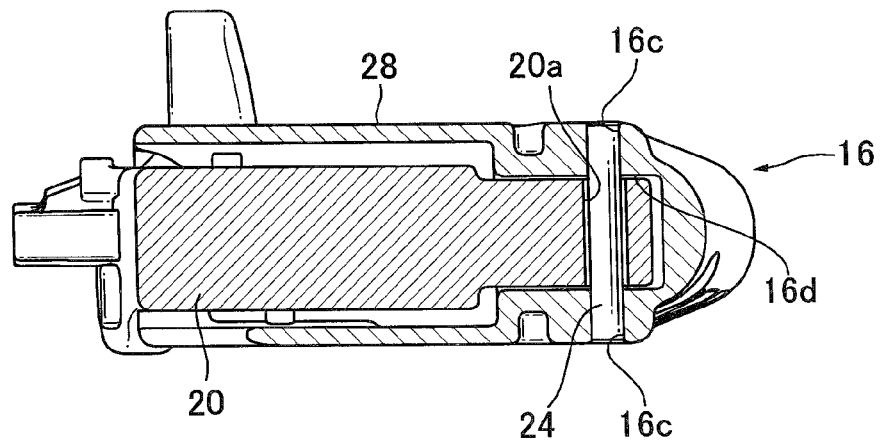

As shown in FIGS. 2-4, the rear handle 10 has a grip portion 16 extending in the front-back direction A with respect to the operator, a front arm 18 extending from a front portion 16a of the grip portion 16 to the body 6, and a rear arm 20 extending from a rear portion 16b of the grip portion 16 to the body 6. A rectangular opening 22 is formed between the body 6 and the rear handle 10 (see FIG. 1).

The front arm 18 and the rear arm 20 are configured to be more flexible in the front-back direction A than in directions (vertical direction B and lateral direction C) perpendicular to the front-back direction A. In the present embodiment, cross-sections of the front arm 18 and the rear arm 20 are rectangular, and a length of the cross-section in the front-back direction A is shorter than that of the cross-section in the vertical direction B. Further, the front arm 18 and the rear arm 20 straightly extend from the grip portion 16 to the body 6.

In order to easily make the front arm 18 and the rear arm 20 flexible, it is preferable that a density of a material of the front arm 18 and the rear arm 20 be relatively small, and such a material is, for example, resin. In the present embodiment, the front arm 18 and the rear arm 20 are formed of PP (polypropylene).

On the other hand, it has been found that when the grip portion 16 is made of a material with a relatively small density like that of the front arm 18 and the rear arm 20, the rear handle 10 may resonate during operations of the blower 1. In order to make the grip portion 16 heavy to make the frequency of occurrence of resonance low, a density of the material of the grip portion 16 is preferably larger than that of the material of the front arm 18 and the rear arm 20. Such a material is, for example, resin. In this embodiment, the grip portion 16 is formed of glass-fiber-reinforced PA (polyamide).

The front arm 18 is pivotally coupled to the grip portion 16 via a spring pin or a bolt 24, while the rear arm 20 is pivotally coupled to the grip portion 16 via a spring pin or a bolt 24. Concretely, respective upper and lower portions of the front portion 16a and rear portion 16b of the grip portion 16 are provided with apertures 16c through which the spring pins are tightly inserted, the front arm 18 and the rear arm 20 are fitted into a recessed portion 16d between the upper and lower portions of the grip portion 16, and the front arm 18 and the rear arm 20 are provided with apertures 18a, 20a through which the spring pins 24 are loosely inserted (see especially FIG. 4).

Further, the front arm 18 and the rear arm 20 are "integrally coupled" to the body 6, such that, for example, at respective coupling portions between the front and rear arms 18, 20 and the body 6, the respective positional relationships between the front and rear arms 18, 20 and the body 6 are not changed; namely, the front and rear arms 18, 20 are neither pivoted nor slid with respect to the body 6. Thus, the front arm 18, the rear arm 20 and the body 6 may be formed in one piece or various pieces. In the present embodiment, the front arm 18 and the rear arm 20 are formed with a mount bracket 25 as one piece, and the mount bracket 25 is fitted and integrally attached to the body 6. Alternatively, the mount bracket 25 may be bolted to the body 6.

Further, a front tube 26 spaced from and disposed around the front arm 18 and a rear tube 28 spaced from and disposed around the rear arm 20 are coupled to the grip portion 16.

Next, operation of the blower 1 according to an embodiment of the present invention will be explained. During operation in which the front handle 8 is held by one hand and the rear handle 10 is held by the other hand, due to the flexibility of the front arm 18 and the rear arm 20 in the front-back direction A, a vibration in the front-back direction A transmitted from the body 6 to the operator can be reduced. Such a vibration in the front-back direction A is the major part of the entire vibration transmitted from the body 6 to the operator. As a result, the vibration as a whole can be effectively reduced.

Also, since a weight of the rear handle 10 is much smaller than that of another rear handle with a spring device or an anti-vibration rubber device, it does not have great influence on the maneuverability of the blower 1. Further, since the front arm 18 and the rear arm 20 are fitted into a recessed portion 16d between the upper portion and the lower portion of the grip portion 16, a coupling portion in the vertical direction B between the rear handle 10 and the body 6 is relatively rigid, and thus an maneuverability in which the air outlet 12 of the blower 1 is turned in a desired direction is ensured.

The present inventors have compared an equivalent vibration in the conventional blower in which the front and rear arms thereof are hard to flex in the front-back direction A, with that in the blower according to the present invention in M which the front and rear arms 18, 20 are easy to flex in the front-back direction A, based on the standard of the ISO 5349 (guideline for measurement and assessment of vibration exposure transmitted to hands). As a result, it was found that the equivalent vibration of the conventional blower at the rear handle thereof was 15.7 m/s$^2$, while that of the blower 1 according to the present invention at the rear handle 10 thereof was reduced to 7.1 m/s$^2$.

Further, since the grip portion 16 is made of a material having a relatively large density, the grip portion 16 has a strength greater than those of the front arm 18 and the rear arm 20. Thus, by selecting an appropriate material, damage to the grip portion 16 can be prevented in a case where the blower 1 is dropped. Further, since the front tube 26 and the rear tube 28 are coupled to the grip portion 16, damage to the front arm 18 and the rear arm 20 can be prevented and a design of the rear handle 10 can be simplified.

Figure 5:
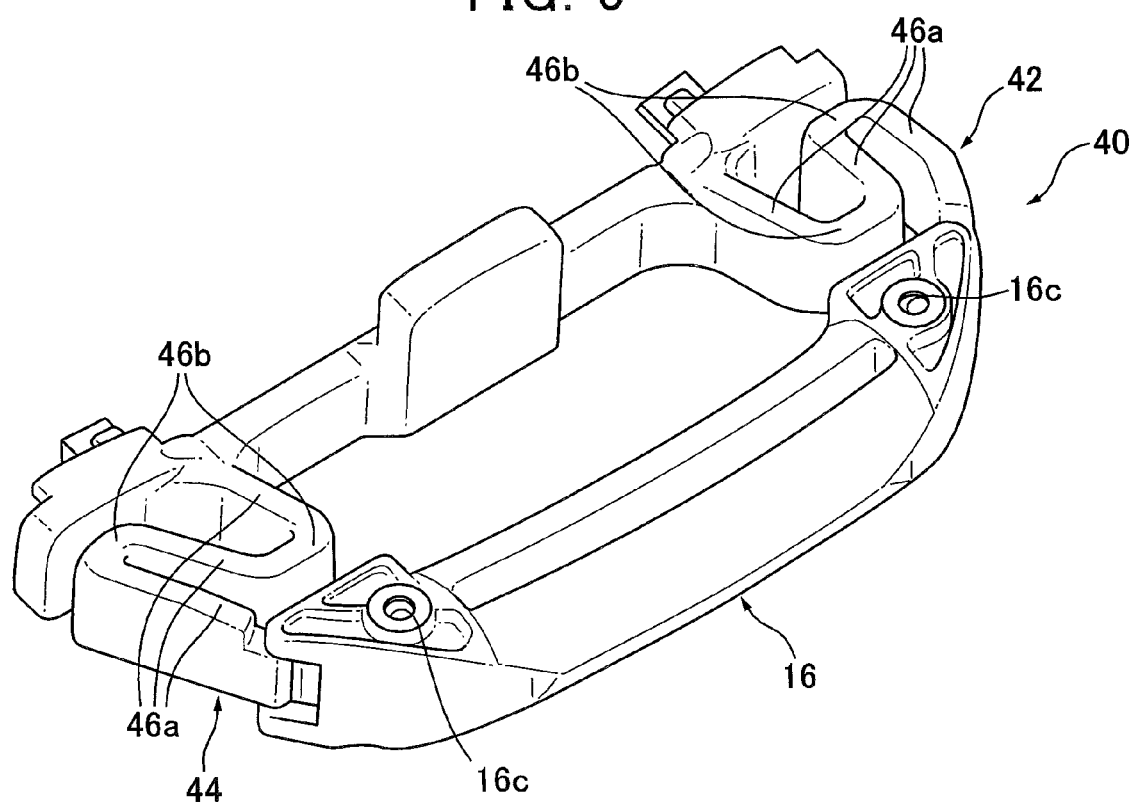

FIG. 5 shows a second embodiment of the rear handle.

A rear handle 40 according to the second embodiment of the present invention has the same structure as that of the rear handle 10 according to the first embodiment of the present invention except that each of a front arm 42 and a rear arm 44 is formed by three straight portions 46a and two folded portions 46b from the grip portion 16 to the body 6 and there are no front and rear tubes 26, 28.

The present inventors have confirmed by experiments that the vibration in the front-back direction A from the body 6 can also be reduced by the rear handle 40.

The embodiments of the present invention have been explained, but the present invention is not limited to the above-mentioned embodiments and it is apparent that the embodiments can be modified within the scope of the present invention set forth in the claims.

In the above-mentioned embodiments, in addition to the rear handle 10, 40 including the grip portion 16, the front arm 18, 42 and the rear arm 20, 44, the front handle 8 may also include the grip portion 16, the front arm 18, 42 and the rear arm 20, 44. Alternatively, if a vibration in the front-back direction A transmitted from the body 6 to the hands of the operator is reduced, the blower 1 may have only the front handle including the grip portion 16, the front arm 18, 42 and the rear arm 20, 44.

In the above-mentioned embodiments, although the front arm 18, 42 is pivotably coupled to the grip portion 16 and integrally coupled to the body 6, while the rear arm 20, 44 is pivotably coupled to the grip portion 16 and integrally coupled to the body 6, if a vibration in the front-back direction A transmitted from the body 6 to the hands of the operator is reduced, the front arm 18, 42 may be integrally coupled to the grip portion 16 and the body 6, while the rear arm 20, 44 may be integrally coupled to the grip portion 16 and the body 6. Alternatively, contrary to the above-mentioned embodiment, the front arm 18, 42 may be integrally coupled to the grip portion 16 and pivotably coupled to the body 6, while the rear arm 20, 44 may be integrally coupled to the grip portion 16 and pivotably coupled to the body 6.

In the above-mentioned embodiments, although the shapes of the cross sections of the front arm 18, 42 and the rear arm 20, 44 are rectangular, if the front arm 18, 42 and the rear arm 20, 44 are more flexible in the front-back direction A than in the vertical direction B and lateral direction C, the shapes of the cross section of the front arm 18, 42 and the rear arm 20, 44 are arbitrary.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A handheld blower comprising:
   a body including a combustion engine and a blower section driven by the combustion engine, and
   a handle coupled to the body,
   wherein the blower section has an air outlet directed forward with respect to an operator,
   wherein the handle has a grip portion extending in a front-back direction with respect to the operator, a front arm extending from a front portion of the grip portion to the body, and a rear arm extending from a rear portion of the grip portion to the body, and
   wherein the front arm and the rear arm are more flexible in the front-back direction than in directions perpendicular to the front-back direction so that due to the flexibility of the front arm and the rear arm in the front-back direction, a vibration in the front-back direction transmitted from the body to the operator can be reduced.

2. The blower according to claim 1, wherein the front arm is pivotally coupled to the grip portion and integrally coupled to the body, and wherein the rear arm is pivotally coupled to the grip portion and integrally coupled to the body.

3. The blower according to claim 2, wherein a front tube spaced from and disposed around the front arm is coupled to the grip portion, and a rear tube spaced from and disposed around the rear arm is coupled to the grip portion.

4. The blower according to claim 1, wherein cross sections of the front arm and the rear arm are rectangular, and lengths of the cross sections in the front-back direction are shorter than lengths of the cross sections in a direction perpendicular to the front-back direction.

5. The blower according to claim 1, wherein the front arm and the rear arm straightly extend from the grip portion to the body.

6. A handheld blower comprising:
   a body including a combustion engine and a blower section driven by the combustion engine, and
   a handle coupled to the body,
   wherein the blower section has an air outlet directed forward with respect to an operator,
   wherein the handle has a grip portion extending in a front-back direction with respect to the operator, a front arm extending from a front portion of the grip portion to the body, and a rear arm extending from a rear portion of the grip portion to the body,
   wherein the front arm and the rear arm are more flexible in the front-back direction than in directions perpendicular to the front-back direction, and
   wherein a density of the grip portion is larger than those of the front arm and the rear arm.

7. A handheld blower comprising:
   a body including a combustion engine and a blower section driven by the combustion engine, and
   a handle coupled to the body,
   wherein the blower section has an air outlet directed forward with respect to an operator,
   wherein the handle has a grip portion extending in a front-back direction with respect to the operator, a front arm extending from a front portion of the grip portion to the body, and a rear arm extending from a rear portion of the grip portion to the body,
   wherein the front arm and the rear arm are more flexible in the front-back direction than in directions perpendicular to the front-back direction, and
   wherein the handle is a rear handle laterally extends from the body and the blower further comprises a front handle coupled to an upper portion of the body.

* * * * *